United States Patent
Bauer et al.

(10) Patent No.: US 9,803,588 B2
(45) Date of Patent: Oct. 31, 2017

(54) DEVICE FOR BURNING OFF PROPELLANTS OR EXPLOSIVE SUBSTANCES

(75) Inventors: Karl Bauer, Soyen (DE); Andreas Hacker, Gars (DE); Detlev Friedemann, Kraiburg (DE); Claudia Rienäcker, Waldkraiburg (DE); Hans Weigand, Trostberg (DE)

(73) Assignee: Bayern-Chemie Gesellschaft Fur Flugchemische Antriebe mbh, Aschua/Inn (DE)

( * ) Notice: Subject to any disclaimer, the term of this patent is extended or adjusted under 35 U.S.C. 154(b) by 886 days.

(21) Appl. No.: 14/131,274

(22) PCT Filed: Jul. 7, 2011

(86) PCT No.: PCT/EP2011/003376
§ 371 (c)(1),
(2), (4) Date: Aug. 4, 2014

(87) PCT Pub. No.: WO2013/004259
PCT Pub. Date: Jan. 10, 2013

(65) Prior Publication Data
US 2014/0338306 A1    Nov. 20, 2014

(51) Int. Cl.
| F02K 9/38 | (2006.01) |
| F42B 39/14 | (2006.01) |
| F02K 9/95 | (2006.01) |

(52) U.S. Cl.
CPC ............ *F02K 9/38* (2013.01); *F02K 9/95* (2013.01); *F42B 39/14* (2013.01)

(58) Field of Classification Search
CPC ...... F02K 9/24; F02K 9/28; F02K 9/38; F02K 9/42; F02K 9/72; F02K 9/95
See application file for complete search history.

(56) References Cited

U.S. PATENT DOCUMENTS

| 5,466,537 A | 11/1995 | Diede et al. |
| 5,959,235 A | 9/1999 | Wagstaff |

FOREIGN PATENT DOCUMENTS

| EP | 2128559 A2 | 12/2009 |
| EP | 2372299 A2 | 10/2011 |

OTHER PUBLICATIONS

International Search Report dated Mar. 26, 2012 for International Patent Application No. PCT/EP2011/003376.
Written Opinion dated Mar. 26, 2012 for International Patent Application No. PCT/EP2011/003376.

*Primary Examiner* — Arun Goyal
(74) *Attorney, Agent, or Firm* — Morgan Lewis & Bockius LLP

(57) ABSTRACT

The invention relates to a device for burning off propellants or explosive substances, which has an activation temperature that lies below the spontaneous ignition temperature of the propellant or explosive substance. The device (1) comprises at least two substances (5, 6) reacting exothermically with one another, wherein at least one first substance (5) is present in a liquid aggregate state below the activation temperature of the device and is separated from at least one second substance (6) by at least one pressure-tight barrier (7).

11 Claims, 2 Drawing Sheets

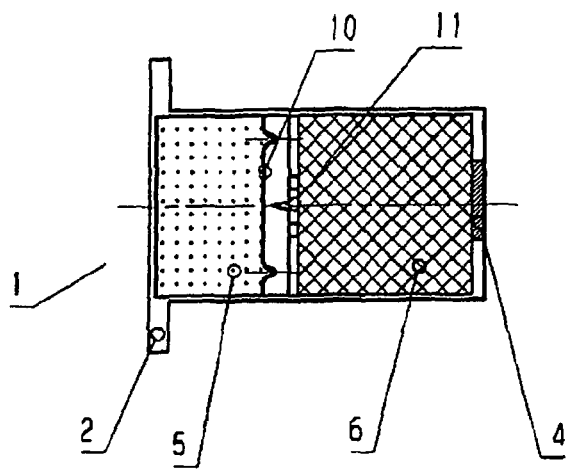
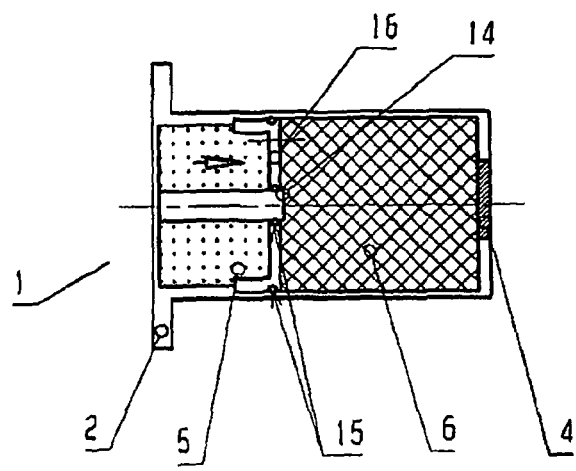

DEVICE FOR BURNING OFF PROPELLANTS OR EXPLOSIVE SUBSTANCES

CROSS-REFERENCE TO RELATED APPLICATIONS

This application is a U.S. national stage of International Application No. PCT/EP2011/003376, filed Jul. 7, 2011, which is incorporated by reference herein in its entirety.

The invention relates to a device for the controlled burning of fuels or explosives according to the preamble of claim 1.

Especially solid fuels for rockets often have the property that they burn faster at higher temperatures and may even detonate in certain circumstances. If the fuel is slowly heated to autoignition temperature from an external source, for example due to an accident such as a fire on an aircraft carrier, it is possible that the fuel will suddenly ignite and explode in the manner of a detonating agent, often with devastating effects on people and surroundings. To avoid such a misfortune, it would be preferable to deliberately burn the fuel before detonation can occur.

In order to start the rocket engine burning below the fuel's autoignition temperature, it is known practice to install early ignition systems into rocket engines that ignite the fuel at a defined trigger temperature, yet remain passive below the trigger temperature, i.e. without any danger of unwanted ignition.

Such a system for burning a fuel or explosive according to the preamble of claim 1 is already known from U.S. Pat. No. 5,959,235 A.

In this system, one substance is embedded in another with which it produces an exothermic reaction. The reaction of these two substances occurs if at least one of them melts and subsequently mixes with the other to react exothermically. I.e. the melting point of at least one substance determines the trigger temperature and thus also the intensity of the exothermic reaction. There are, however, only few substances that satisfy these conditions. This applies all the more if the two substances only react exothermically at the necessary intensity when both are molten.

The present invention's purpose is to provide a device for burning fuel or explosives that reliably ignites the fuel in targeted fashion at a specific temperature, yet causes no reaction whatsoever below this temperature and is suitable for a wide range of ignition temperatures.

The purpose is achieved by a device according to patent claim 1. Advantageous embodiments of the device are dealt with in the dependent claims.

The invention is a device for the controlled burning of fuels and explosives at a trigger temperature below the autoignition temperature of the fuel or explosive. The device according to the invention has at least two substances that will react exothermically with each other. At least one first substance exists in a liquid state of aggregation below the trigger temperature of the device. This first substance is separated from at least a second substance by at least one pressure-tight barrier. The second substance can exist in a solid state of aggregation at the trigger temperature. It would preferably feature a large surface area and can therefore be in powder form, for example.

The first substance preferably remains solid at room temperature, in particular at the maximum permissible storage and operating temperature of the rocket, i.e. the fuel, or the maximum permissible storage and operating temperature of the explosive, in order to avoid its reaction with the second substance at this temperature, for example due to leaks in the barrier.

That means the melting point of the first substance can even be only a few degrees Celsius, for example a mere 10° C. or less, below the trigger temperature.

The solid fuel propellant of a rocket engine is designed, for example, such that it burns nearly continuously if the mass of the propellant remains at a relatively low temperature. If, on the other hand, a solid fuel rocket engine is heated by a fire to the autoignition temperature of, say, 160° C. or higher, then a deflagration or explosion can occur.

The trigger temperature, that is the temperature at which the device according to the invention is triggered, should be as far as possible from the maximum permissible storage and operating temperature of the fuel or explosive, of say +70° C., yet also as far as possible from the autoignition temperature of the fuel or explosive. For rocket fuels, the desired trigger temperature is at least 90° C., in particular at least 100° C. and at most 150° C., in particular at most 130° C. The closer the trigger temperature comes to the autoignition temperature, the more extreme a potential explosive reaction could be.

This ensures the fuel or explosive is burned in targeted and controlled fashion below the autoignition temperature of the fuel.

An exothermic reaction of two substances arranged at a specific position of the combustion chamber of the rocket, e.g. the face side, i.e. opposite the rocket jet, can targetedly ignite the fuel inside the rocket at a specific temperature. The trigger temperature is therefore preferably below the autoignition temperature of the fuel or explosive, at which these typically remain passive and the danger of unwanted ignition does not exist.

In one embodiment of the device, the pressure-tight barrier comprises at least one material whose melting temperature is at least equal to the trigger temperature of the device. At the device's trigger temperature, the barrier material melts, whereupon the liquid of the first substance flows to the second substance, mixes with the second substance leading to an exothermic reaction that creates heat, hot particles and/or a stream of hot gas to ignite the fuel or explosive.

In one embodiment of the device, the pressure-tight barrier features at least one flow-through opening. This flow-through opening is configured, for example, as a channel that is open at both sides of the barrier and is plugged with a fusible material. The fusible material preferably has a melting temperature equal to the trigger temperature of the device.

Upon reaching the trigger temperature, the material melts so that the first substance comes through the flow-through opening and into contact with the second substance, mixing with the latter and leading to an exothermic reaction of the two substances. The exothermic reaction of the two substances releases heat and/or hot particles and/or a stream of hot gas, which escape(s) the device and thereby ignite(s) the fuel or explosive.

In one embodiment of the device, the pressure-tight barrier is made from at least one membrane comprising a puncture mechanism. When the membrane is displaced, the puncture mechanism punctures the membrane, whereupon the first substance, which exists in a liquid state of aggregation at the trigger temperature, comes into contact with the second substance, mixing with the latter and producing an exothermic reaction in which heat, hot particles and/or a stream of hot gas is released.

In another embodiment of the device, the pressure-tight barrier takes the form of a seal. This seal features at least one flow-through opening, which or each of which is kept closed by a piston until the trigger temperature of the device is reached. The seal is preferably able to move and, below the trigger temperature, separates the first substance from the second substance. In one embodiment of the device, the piston(s) are firmly connected to the device and close off the flow-through opening of the seal when below the trigger temperature of the device. If the inner pressure in the area of the first substance increases, then the seal is displaced such that the piston releases the flow-through opening of the seal and the first substance comes into contact with the second substance. In this arrangement, the piston can be prevented from displacement by a solid body of solder, such that displacement of the piston is allowed when the solid body of solder melts at the trigger temperature.

In another embodiment of the device, the device features multiple pressure-tight barriers designed as one or more of the barrier embodiments described above.

In one embodiment, the device has multiple pressure-tight barriers, where at least one first barrier comprises a material whose melting temperature is at least equal to the trigger temperature of the device, where at least a second barrier is formed by a membrane comprising a puncture mechanism, where at least a third barrier features a seal with a flow-through opening that is closed by a piston when below the trigger temperature of the device, and/or where at least one other barrier features at least one complete opening that is plugged by a material whose melting temperature is equal to the trigger temperature of the device.

The pressure-tight barriers can be combined with one another in various embodiments and in any order. Combining multiple pressure-tight barriers that operate on different principles makes the device safer against unwanted triggering of the device. Even a combination of multiple barriers ensures triggering upon reaching the triggering temperature, so that the fuels or explosives can burn in controlled fashion.

In one embodiment of the device, at least one first substance has a higher pressure than at least a second substance when below triggering temperature of the device.

Being under higher pressure allows the first substance to come into contact with the second substance upon elimination of the barrier or upon opening of the barrier, and to mix with the second substance, leading to an exothermic reaction in which heat, hot particles and/or a stream of hot gas is/are produced.

In one embodiment, the device is arranged inside the combustion chamber of a rocket, in particular of a solid fuel rocket.

In one embodiment of the device, the fuel or explosive is housed in a combustion chamber of the rocket in such a way that the fuel will ignite below the autoignition temperature due to the exothermic reaction of the at least two substances in the device.

In one embodiment, the device features an opening that is closed with a plug. The plug is preferably made of a material that will melt at the trigger temperature of the device. When the plug melts, the opening is released and hot particles of the substances inside the device can escape from the device.

The escaping hot particles ignite the fuels or explosives present in the combustion chamber of the rocket.

It is possible to employ the device described above in other pyrotechnical components in which early controlled ignition is desired in the event of slow, external heating.

The device described above is explained in greater detail with the aid of accompanying drawings.

Schematically,

FIGS. 3 and 4 show cross-sections through other embodiments of the device.

Figure 1:
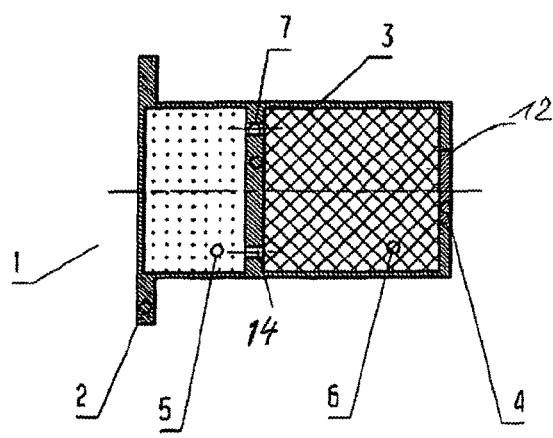
FIG. 1 shows a cross-section through one embodiment of the device.

FIG. 1 schematically shows a cross-section through a device 1, in which the housing 2 of the device 1 is divided into two separate chambers by a partition 3. In the left chamber is a first substance 5, in the right chamber a second substance 6. The first substance 5 exists as a liquid below the trigger temperature of the device.

The exothermic reaction of the first substance with the second substance can be, for example, an oxidation, neutralization or hydration reaction. For example, a reducer such as a sugar, glycerin or similar agent that melts below the trigger temperature, can take place with an oxidizer such as an alkaline permanganate. Furthermore, for example, an acid such as hydrochloric acid, or a mixture of an acid with another substance that is liquid below the trigger temperature, can react with a base such as an alkaline hydroxide such as sodium hydroxide, thereby producing an exothermic neutralization reaction. It is also possible to mix water or an aqueous mixture e.g. with an alkaline or alkaline earth oxide such as calcium oxide, to produce an exothermic hydration reaction.

In these cases, the first substance 5 preferably contains a propellant, for example water in the form of water vapour below the trigger temperature, in order to propel the first substance 5 by pressure increase through the flow-through openings 14 and into the chamber with the second substance 6.

The partition 3 in the presented embodiment of the device 1 features two flow-through openings 14, which are closed off by pressure-tight barriers 7. The pressure-tight barriers 7 are preferably made of a material that will melt at the trigger temperature of the device 1 and release the flow-through openings 14. The pressure-tight barrier 7 can consist of a solder of low melting point, such as a bismuth- and/or lead-based solder.

Upon melting of the pressure-tight barrier 7, the first substance 5 and the second substance 6 can mix with each other. Since the first substance 5 exists as a liquid, the first substance 5 and second substance 6 come into contact immediately. The first substance 5 and the second substance 6 react together exothermically upon contact, leading to heat output that heats the device 1.

In the presented embodiment, the device 1 features an outlet opening 12 in the area of the outer wall of the right chamber, which in default state is closed off with a plug 4. The plug 4 is preferably made of a material that will melt at the trigger temperature of the device 1. This could be, for example, a bismuth- and/or lead-based solder of low melting point. In the reaction of the first 5 and second 6 substance, a pressure increase occurs inside the device 1, whereby hot particles and/or gases of the first 5 and second 6 substance and/or reaction products of these substances can escape through the outlet opening 4, which is open at trigger temperature, and out of the device 1.

Figure 2:
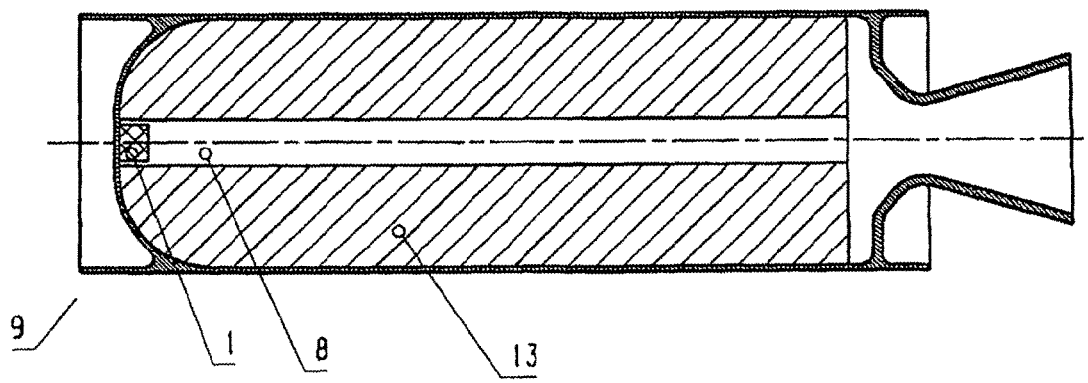
FIG. 2 shows a cross-section through a rocket engine.

FIG. 2 schematically shows a cross-section through a rocket engine 9. Inside the combustion chamber 8 of the rocket engine 9, a device 1 is arranged in the face area of the combustion chamber 8, as is illustrated by way of example in FIGS. 1, 3 and 4.

The device 1 is positioned in the immediate vicinity of the fuel 13 housed in the combustion chamber 8 of the rocket engine 9. The exothermic reaction inside the device 1 targetedly ignites the fuel 13 housed in the combustion chamber 8 of the rocket engine 9 when below the autoignition temperature of the fuel 12, so that it can burn in controlled fashion without resulting in an unwanted detonation-like rapid combustion of the fuel 13 upon external heating of the rocket engine 9. The fuel 13 housed in the combustion chamber 8 of the rocket engine 9 can, for example, be ignited by hot particles or gases escaping from the device 1 from the exothermically reacting substances in the device 1. Alternatively, the fuel 13 can be ignited by the hot housing 2 of the device 1.

FIG. 3 schematically shows another embodiment of the device 1, in which the pressure-tight barrier is formed by a membrane 10 that separates the first substance 5 from the second substance 6. Upon reaching the trigger temperature of the device 1, the first substance 5 will have expanded so far that the membrane 10 comes into contact with a puncture mechanism 11, whereby the membrane 10 will be at least partially punctured. After puncturing of the membrane 10, the first substance 5 in a liquid state of aggregation comes into contact with the second substance 6. The first 5 and second 6 substance react together exothermically, leading to the production of heat.

FIG. 4 schematically shows another embodiment of the device 1, in which the pressure-tight barrier is constructed as a piston 16 and a seal 15. The seal 15 separates the first substance 5 from the second substance 6. The flow-through opening 14 of the seal 15 is closed off by a piston 16 when in default state. Upon reaching the trigger temperature of the device 1, the first substance 5 will have expanded so far that the seal 15 will be pushed towards the second substance 6, whereby the flow-through opening 14 will be opened when the first substance 5 reaches a specific expansion volume. The first substance 5 comes into contact with the second substance 6, whereupon an exothermic reaction takes place in which heat, hot particles and/or a stream of hot gas is/are released.

Although only a limited number of possible embodiments of the device could be described in the examples, the invention is not limited to those embodiments. It is in principle possible, for example, to combine several of the pressure-tight barriers illustrated in FIGS. 1, 3 and 4 successively with one another in any order to ensure safe separation of the first and second substance from each other within the device.

LIST OF REFERENCE NUMERALS

1 Device
2 Housing of the device 1
3 Partition
4 Plug
5 First substance
6 Second substance
7 Barrier
8 Combustion chamber
9 Rocket engine
10 Membrane
11 Puncture mechanism
12 Outlet opening
13 Fuel
14 Flow-through opening
15 Seal
16 Piston

The invention claimed is:

1. A device for burning a fuel or an explosive at a trigger temperature that is below the autoignition temperature of the fuel or the explosive, the device comprising:
   at least two substances including a first substance and a second substance that react exothermically with each other to ignite the fuel or the explosive,
   wherein the first substances exists in a liquid state of aggregation when below the trigger temperature of the device and is separated from the second substance by at least one pressure-tight barrier,
   wherein, upon reaching the trigger temperature, the pressure-tight barrier allows contact between the first substance and the second substance.

2. The device according to claim 1, wherein the pressure-tight barrier comprises at least one material having a melting temperature at least equal to the trigger temperature of the device.

3. The device according to claim 1, wherein the pressure-tight barrier features at least one flow-through opening that is closed off with a material having a melting temperature equal to the trigger temperature of the device.

4. The device according to claim 1, wherein the pressure-tight barrier is made from at least one membrane comprising a puncture mechanism.

5. The device according to claim 1, wherein the pressure-tight barrier takes the form of a seal that features at least one flow-through opening, where the flow-through opening is closed off by a piston until the trigger temperature of the device is reached.

6. The device according to claim 1 further comprising: multiple pressure-tight barriers.

7. The device according to claim 1, wherein the first substance, when below the trigger temperature of the device, is under higher pressure than the second substance.

8. The device according to claim 1, wherein the device is arranged inside a combustion chamber of a solid fuel rocket.

9. The device according to claim 8, wherein the fuel is housed in the combustion chamber and is arranged in such a way that the fuel will ignite due to the exothermic reaction of the at least two substances in the device.

10. The device according to claim 9 further comprising: an outlet opening provided with a plug comprising a material that will melt at the trigger temperature of the device.

11. The device according to claim 10, wherein the fuel housed in the combustion chamber can be ignited by hot particles escaping from the outlet opening and/or a stream of hot gas escaping from the outlet opening.

* * * * *